United States Patent

[11] 3,581,764

| | | | | |
|---|---|---|---|---|
| [72] | Inventor | Robert J. Fife<br>Downers Grove, Ill. | [50] | Field of Search............................................ 137/454.2,<br>454.5, 454.6 |
| [21] | Appl. No | 886,855 | | |
| [22] | Filed | Dec. 22, 1969 | [56] | References Cited |
| [45] | Patented | June 1, 1971 | | UNITED STATES PATENTS |
| [73] | Assignee | Crane Co.<br>Chicago, Ill. | 2,656,983 10/1953 Grayson ..................... 137/454.2X<br>2,826,215 3/1958 Wolfslan ..................... 137/454.6 |

*Primary Examiner*—Harold W. Weakley
*Attorney*—George S. Schwind

[54] REPLACEABLE CARTRIDGE UNIT
14 Claims, 15 Drawing Figs.

[52] U.S. Cl...................................................... 137/454.2,
251/256, 251/257, 251/262
[51] Int. Cl............................................................ F16k 27/00

ABSTRACT: A replaceable cartridge-type valve wherein the cartridge has incorporated therein a biased poppet valve, the seat of which faces exteriorly of the cartridge.

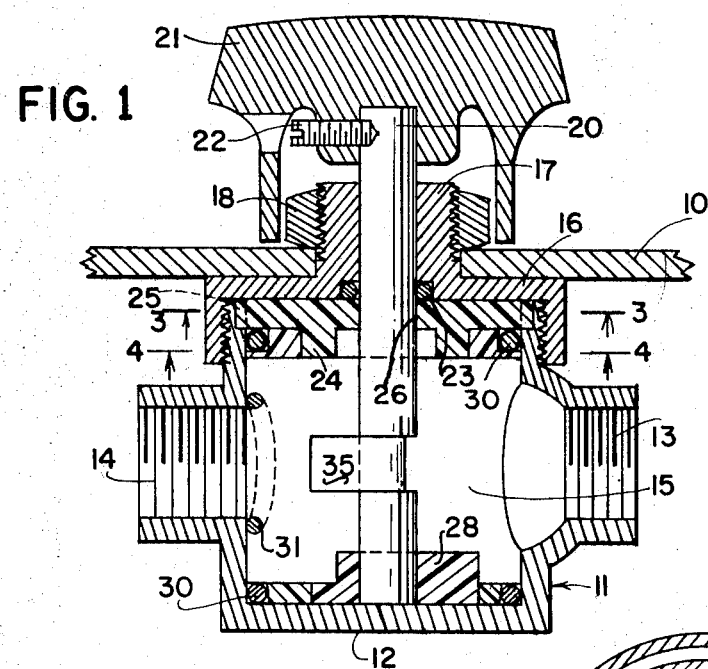
FIG. 1
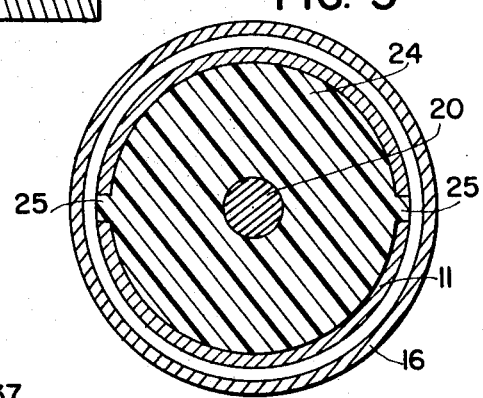
FIG. 3
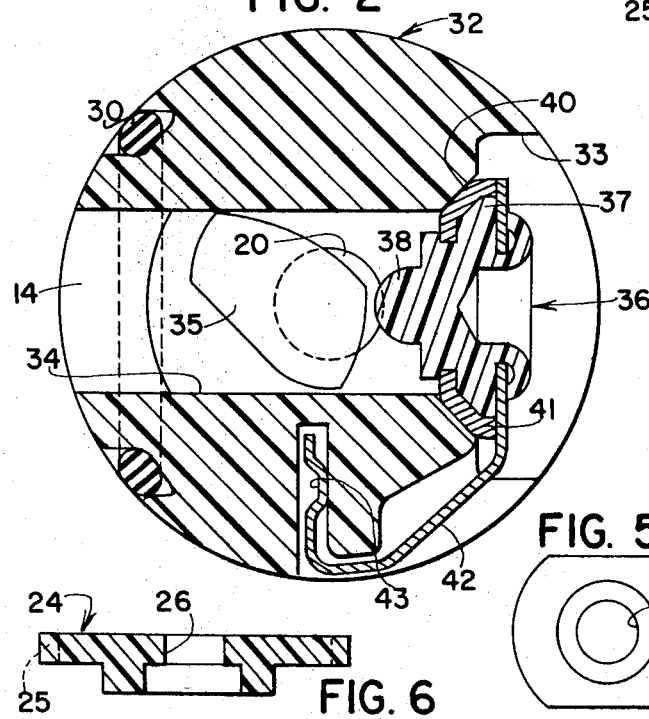
FIG. 2
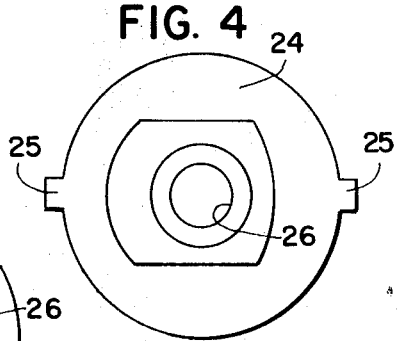
FIG. 4
FIG. 5
FIG. 6
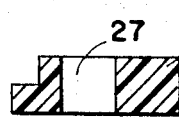
FIG. 7

REPLACEABLE CARTRIDGE UNIT

The invention relates to valve structure and has reference in particular to valves of the faucet type which are characterized by a replaceable valve cartridge having a poppet valve incorporated therein as a unitary element.

An objective of the invention is to provide faucet valve structure for sinks, wash basins, sanitary tubs and the like which will contain a valve cartridge, the same providing a poppet valve as an element unitary therewith, and wherein the valve cartridge is readily removable from the body portion of the faucet whereby to facilitate repairs and replacements.

Another object of the invention is to provide a unitary valve cartridge of plastic or other suitable material and of generally cylindrical shape, wherein the cartridge carries a poppet valve preferably of metal and in a manner permitting easy and convenient removal thereof and wherein the cartridge also carries resilient means for normally maintaining the poppet valve against its seat.

A further object is to provide a unitary valve cartridge for replaceable insertion within the body portion of a faucet valve, which will be relatively simple in construction embodying relatively few parts and wherein the replaceable valve cartridge will be rugged and highly efficient in operation.

Another object of the invention resides in the provision of a unitary cartridge having a poppet valve for actuation by a cam member following insertion of the cartridge within the body portion of the faucet and wherein the cam member will have utility as regards poppet valves which are tilted off their seat as well as those which are axially displaced for an opening action.

With these and various other objects in view the invention may consist of certain novel features of construction and operation as will be more fully described and particularly pointed out in the specification, drawings and claims appended thereto.

In the drawings which illustrate an embodiment of the device and wherein like reference characters are used to designate like parts FIG. 1 is a sectional view taken vertically through valve structure of the faucet type and having a body portion designed for receiving a unitary valve cartridge;

FIG. 2 is a sectional view showing structural details of a cartridge having an axially movable poppet valve;

FIG. 3 is a horizontal sectional view taken substantially along line 3-3 of FIG. 1;

FIGS. 4 and 5 are views on line 4-4 of FIG. 1, the same showing the top plastic washers having location in the body portion;

FIG. 6 is a sectional view of a top plastic washer such as may be used in the valve structure of FIG. 1;

FIG. 7 is a sectional view of a bottom plastic washer such as may be used in the valve structure of FIG. 1;

Figure 8:
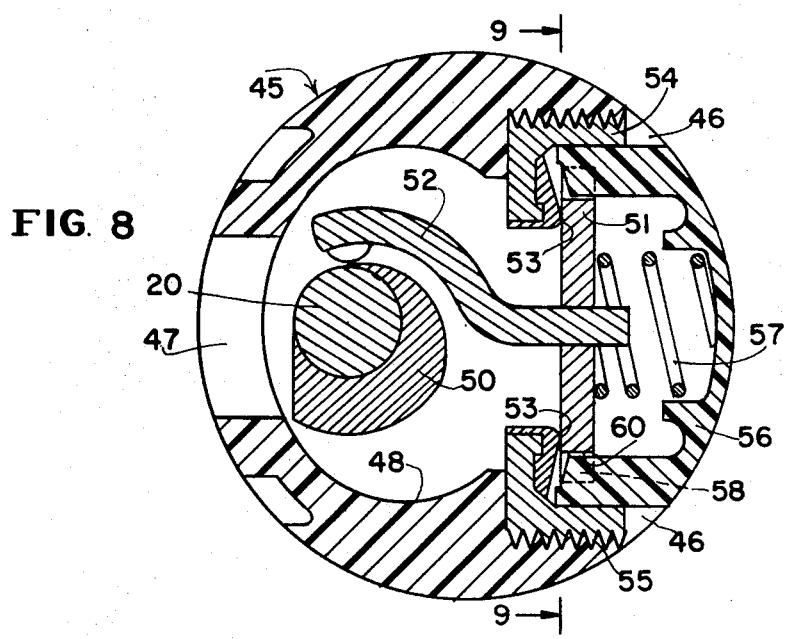
FIG. 8 is a sectional view of a unitary valve cartridge showing a modified form of poppet valve with a resilient coil spring for biasing the valve element into contact with its seat.

FIG. 1 shows faucet valve structure embodying the improvements of the invention as applied to a sink or similar appliance and wherein 10 indicates the top wall of the same. The faucet essentially includes the body portion 11 of generally cylindrical shape having the bottom wall 12 and the internally threaded inlet and outlet connections 13 and 14. A fluid inlet pipe upon being connected at 13 will deliver fluid to the internal cavity 15 of the body portion 11 and the outlet connection 14 will deliver the fluid to an outlet pipe connecting therewith. The body portion is threaded for releasable connection with the bonnet 16 which has the exteriorly threaded projecting portion 17. The said portion 17 extends through an opening in the top wall 10 and receives the lock nut 18 for releasably securing the bonnet to the top wall and whereby the bonnet will be in full and direct contact with the undersurface of the top wall.

The operating stem 20 of the faucet valve extends through the portion 17, through the cavity 15 and into contact with the bottom wall 12. The operating handle 21 is fixed to the projecting end of the stem by the setscrew 22. The conventional O-ring 23 is provided for sealing the stem with respect to the bonnet 16. To facilitate the operation of the unitary valve cartridge, designed for insertion in the cavity 15, and also for additional sealing purposes the invention contemplates the use of a top plastic washer 24 having side projections 25 for interlocking with the body portion as shown in FIG. 3. The washer 24 is shown in FIG. 7 as having a central opening 26 for the passage of the stem 20. The bottom terminal end of the stem 20 enters the terminal end of the stem 20 enters the opening 27 of the bottom plastic washer 28, and O-rings 30 and 31 are preferably employed in specific locations on the inserted valve cartridge which will now be described in detail.

One modification of valve cartridge is shown in FIG. 2. The cartridge 32 is preferably formed of plastic material and is generally cylindrical in shape having top and bottom surfaces designed for accommodating the top and bottom washers 24 and 28, respectively. The circular cavity 33 in the cartridge is disposed in alignment with the inlet opening 13 and the same communicates with the axial passage 34 which leads to the outlet 14. Upon insertion of the cartridge within the cavity 15 of the faucet valve and with the assembling of the parts on the stem 20, it will be observed that the cam 35 on the stem will be located within the passage 34 and in substantial alignment with the cavity 33.

The poppet valve element 36 is located in the circular cavity 33 and said valve element extends within the axial passage 34 so that the valve can be actuated by the cam 35 upon rotation of the stem 20. The said valve element consists of a body portion 37 of plastic or other suitable material and which provides a rear button 38 for contact by the cam 35. The plastic material of the cartridge 32 is formed to provide the diagonal valve seat 40 and said body portion of the valve element retains the annular member 41 of metal and which is adapted to seat on the surfaces 40 for closing the inlet opening.

The valve element 36 is supported and tensioned by the spring member 42 having the general shape of a U and which is anchored at 43 in the body portion of the plastic cartridge 32. The insertion of the cartridge in the body part 11 of the faucet will align the valve element 36 with the inlet opening 13. Also the cam 35 will be disposed in alignment with the button 38 and thus rotation of the stem 20 will cause the cam to contact the button and the valve element is opened in substantially an axial direction to admit the fluid from the inlet opening and which will flow through the passage 34 to the outlet 14. Thus the unitary valve cartridge can be inserted and removed from the faucet in the most convenient manner to facilitate repairs on the cartridge removed or the replacing of the same with a new cartridge.

Figure 9:
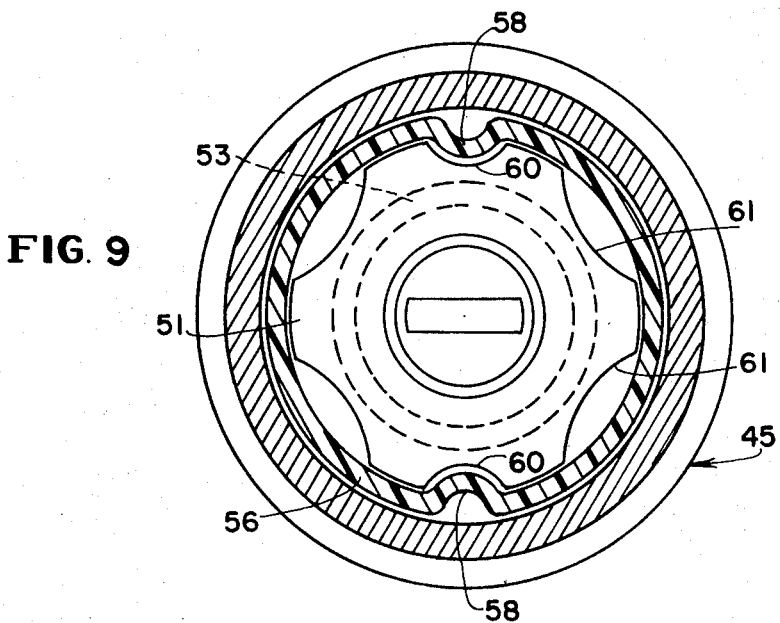
FIG. 9 is a sectional view taken substantially along line 9-9 of FIG. 8.
Figure 10:
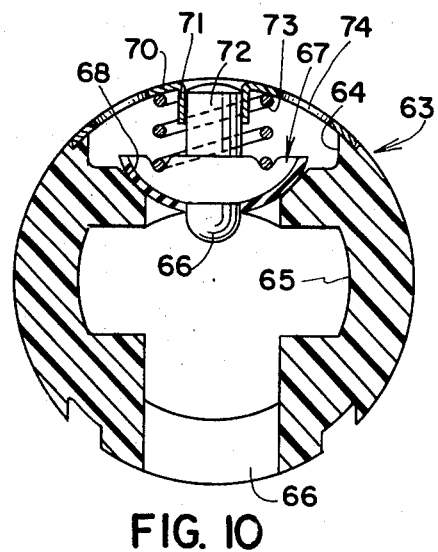
FIG. 10 is a sectional view of a unitary valve cartridge showing another modified form of poppet valve coming within the invention.
Figure 12:
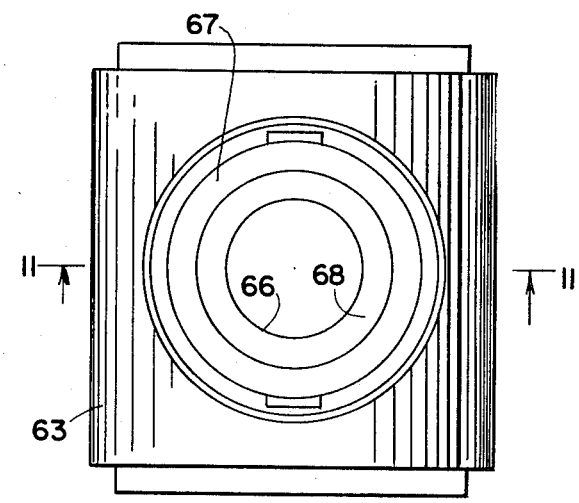
FIG. 12 is an elevational view taken substantially along line 12-12 of FIG. 11.

The valve element in the modified form of cartridge 45 as shown in FIGS. 8 and 9 is adapted to be tilted on its seat for an opening action. The body portion of the cartridge is formed of plastic or other suitable material and the same is substantially cylindrical having an inlet cavity 46, an outlet opening 47, and an axial passage 48. When the cartridge is operatively positioned within the faucet, the stem 20 will extend through the passage and the cam 50 on the stem will be operative for camming the valve element 51 in an opening direction. For this purpose the bent lever 52 is suitably fixed to the element so that a camming of the bent lever 52 will rock the element 51 on its seat tilting a portion of the same for opening the valve.

In this modification the valve seat 53 preferably of metal is unitary with the metal insert 54 which is threaded at 55 in the cavity 46. The retaining plate 56 has a press fit in the insert 54 and said plate confines the coil spring 57 between the same and the valve element thus yieldingly holding the valve element against its seat 53. Rotation of the valve element is prevented by the inwardly directed semicircular portions 58 which interfit with the recesses 60 respectively formed in the valve element. The semicircular portions 58 are part of the retaining plate 56, whereas the recesses 60 and 61 are formed in the valve member. The retaining plate includes a number of openings for admitting the fluid from the inlet, and with the opening of the valve element the flow of liquid is facilitated by the recesses 61. When the cartridge of FIGS. 8 and 9 has been operatively positioned within the faucet valve, rotation of the stem 20 will cause the cam 50 to rock the valve element on its seat. As shown in FIG. 8 the rocking will take place in a clockwise direction and the valve element will open to a maximum extent at its upper end to permit flow of fluid from the inlet to the outlet.

The modification of valve cartridge as shown in FIGS. 10 to 14, inclusive, is characterized by a metal plate which functions as a valve guide and coil spring retainer. The body portion of the cartridge 63 is formed of plastic material and the same is generally cylindrical. The cavity 64 is located on the inlet side and the axial passage 65 communicates therewith and also with the outlet 66. The passage accommodates the stem 20 having the cam 35 and which is adapted to contact the button 66 of the valve element 67. The valve element in this modification is generally semispherical and the plastic cartridge provides the valve seat 68 for the valve element. The plate 70 is formed to provide the inwardly directed guiding portion 71, best shown in FIG. 14, and which receives and guides the rear stud 72 which is formed integral with the valve element 67. The coil spring 73 is retained between the plate 70 and the valve element 67 and said coil spring thus yieldingly maintains the valve element in contact with its seat 68. The cartridge 63 is inserted within the faucet valve so that the plate 70 is disposed adjacent the inlet opening 13. Thus the liquid will flow through the openings 74 in the plate and past the valve to the outlet upon an opening action of the valve element 67.

Figure 11:
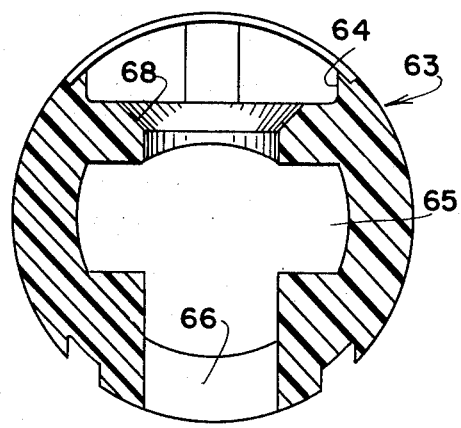
FIG. 11 is a sectional view similar to FIG. 10 but without the poppet valve structure.
Figure 13:
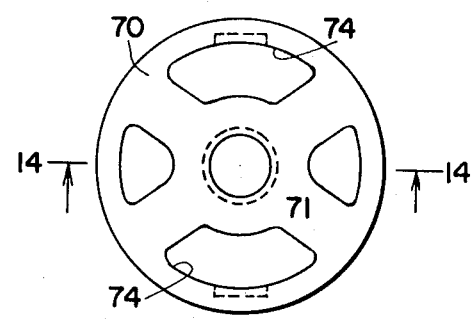
FIG. 13 is an elevational view of the valve guide and coil spring retainer.
Figure 15:
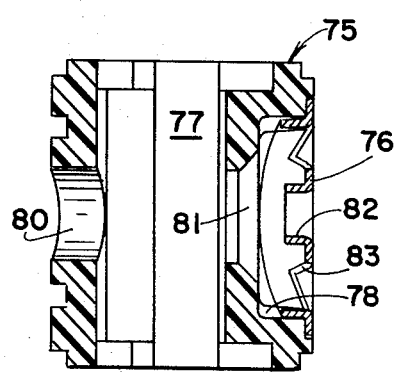
FIG. 15 is a sectional view showing another modified form of valve cartridge as contemplated by the invention.
Figure 14:
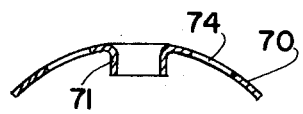
FIG. 14 is a sectional view taken substantially along line 14-14 of FIG. 13.

The valve cartridge 75 of FIG. 11 is generally similar to the cartridge 63 although the same does retain a different form of plate 76. The cartridge is cylindrical having an axial passage 77. An inlet cavity 78 and an outlet 80 have communication with the passage. The base of the inlet cavity is formed to provide the surfaces 81 as a seat for the valve element in a manner similar to that as described for FIG. 10. The metal plate 76 is suitably retained by the cartridge 75 in position over the cavity 78 and said plate has an inwardly directed guiding portion 82 and the liquid inlet openings 83. Thus the cartridge 75 is adapted for a valve element such as 67 and which will seat on the surfaces 81. A coil spring similar to 73 will be confined between the said valve element and the plate.

What I claim is:

1. In a faucet valve of the character described in combination, a substantially cylindrical valve housing having an interior space adapted to receive a valve cartridge, an inlet opening provided by the valve housing and an angularly displaced outlet opening, said inlet and outlet openings each having communication with the said space, a valve cartridge for insertion within the interior space of the housing, said cartridge having a generally cylindrical shape and having an axial passage, said cartridge having a transverse inlet opening providing a valve seat which faces exteriorly of the cartridge and also a transverse opening providing an outlet, said transverse openings communicating with the axial passage, a valve element for said cartridge adapted to seat on the said valve seat to thereby close the inlet opening, and resilient means carried by the cartridge and operative to yieldingly maintain the valve element in contact with the valve seat.

2. A faucet valve of the character as defined by claim 1, wherein the cartridge is formed of plastic material, and wherein said resilient means comprises a resilient member which is fixed to the valve element at one end and is anchored in the plastic cartridge at its other end.

3. A faucet valve of the character as defined by claim 1, additionally including a valve stem adapted to extend from exteriorly of the valve housing to within the axial passage, and a cam member carried by the valve stem and adapted to contact the valve element upon proper rotation of the cam member as effected by rotation of the valve stem.

4. A faucet valve of the character as defined by claim 1, wherein the valve element includes an integral button projecting inwardly into the axial passage, and additionally including a valve stem adapted to extend from exteriorly of the valve housing to within the axial passage, and a cam member carried by the valve stem and adapted to contact the said button on the valve element upon proper rotation of the cam member as effected by rotation of the valve stem.

5. A faucet valve of the character as defined by claim 1, wherein the valve element includes a lever arm fixed thereto and projecting into the axial passage, and additionally including a valve stem adapted to extend from exteriorly of the valve housing to within the axial passage, and a cam member carried by the valve stem and adapted to contact the said lever arm upon proper rotation of the cam member as effected by rotation of the valve stem.

6. In a faucet valve of the character described, in combination, a substantially cylindrical valve housing having an interior space adapted to receive a valve cartridge, an inlet opening provided by the valve housing and an outlet opening spaced approximately diametrically of the inlet opening, said inlet and outlet openings each having communication with the said space, a valve cartridge for insertion within the interior space of the housing, said cartridge having a generally cylindrical shape and having an axial passage extending for approximately the length thereof, said cartridge having a transverse inlet opening providing a valve seat and also a transverse opening providing an outlet, said transverse openings communicating with the axial passage, said cartridge having a cavity in its cylindrical surface in concentric relation with the valve seat, a valve element located in the cavity and adapted to seat on the valve seat to thereby close the inlet opening, and resilient means carried by the cartridge and operative to yieldingly maintain the valve element in contact with the valve seat.

7. A faucet valve of the character as defined by claim 6, wherein the resilient means comprises a resilient member which is fixed to the valve element at one end and is anchored at its other end in the body portion of the cartridge.

8. A faucet valve of the character as defined by claim 6, additionally including a plate member on the exterior of the cartridge in position over the said cavity, and wherein the resilient means comprises a coil spring which is confined between the valve element and the said plate member.

9. A faucet valve of the character as defined by claim 6, additionally including a plate member on the exterior of the cartridge in position over the said cavity, said plate member having an inwardly directed stud guiding portion integral therewith and also having a plurality of liquid inlet openings formed therein, and wherein the resilient means comprises a coil spring which is confined between the valve element and the said plate member.

10. A faucet valve of the character as defined by claim 6, additionally including a forward stud integral with the valve element, a plate member on the exterior of the cartridge in position over the said cavity, said plate member having an inwardly directed guiding portion for receiving and guiding the said stud which extends forwardly of the valve element, said plate member having a plurality of openings for admitting liquid, and wherein the resilient means comprises a coil spring which is confined between the valve element and the said plate member.

11. A valve cartridge of the character described, in combination, a cylindrical body portion having an axial passage extending for substantially its entire length, said body portion having a pair of transverse openings formed therein and disposed approximately opposite each other, said openings having communicating relation with the passage, one of said openings providing a liquid inlet and having a valve seat disposed concentrically thereof and which faces exteriorly of the body portion, the other of said openings providing a liquid outlet, a valve element in contact with the valve seat and adapted to have closing and opening action with respect thereto, a member fixed to the valve element on the rear side thereof and which projects into the passage, said member facilitating the opening action of the valve element, and resilient means carried by the body portion for yieldingly maintaining the valve element in contact with its seat.

12. A valve cartridge of the character as defined by claim 11, wherein the resilient means comprises a resilient member having the valve element fixed to one end thereof and having its other end anchored in the body portion.

13. A valve cartridge of the character described, in combination, a cylindrical body portion having an axial passage extending for substantially its entire length, said body portion having a pair of transverse openings formed therein and disposed approximately opposite each other, said openings having communicating relation with the passage, one of said openings providing a liquid inlet and having a valve seat disposed concentrically thereof and which faces exteriorly of the body portion, the other said opening providing a liquid outlet, said body portion having a cavity in its cylindrical wall in concentric relation with the valve seat, a valve element located in the cavity and having contact with the valve seat, a plate member on the body portion in disposed relation over the cavity, and a resilient coil spring confined between the valve element and the plate member for yieldingly maintaining the valve element in contact with its seat.

14. A valve cartridge of the character as defined by claim 13, wherein said plate member is formed to provide an inwardly extending stud guiding portion, and additionally including a stud member integral with the valve element and which extends into and is guided by the said stud portion on the plate member.